US009643332B2

(12) United States Patent
Bucks

(10) Patent No.: US 9,643,332 B2
(45) Date of Patent: May 9, 2017

(54) APPARATUS AND METHOD FOR CUTTING PRODUCTS

(75) Inventor: Brent L. Bucks, Lakewood Ranch, FL (US)

(73) Assignee: FAM, Kontich (BE)

(*) Notice: Subject to any disclaimer, the term of this patent is extended or adjusted under 35 U.S.C. 154(b) by 471 days.

(21) Appl. No.: 14/111,443

(22) PCT Filed: Apr. 10, 2012

(86) PCT No.: PCT/EP2012/056404
§ 371 (c)(1),
(2), (4) Date: Nov. 12, 2013

(87) PCT Pub. No.: WO2012/139991
PCT Pub. Date: Oct. 18, 2012

(65) Prior Publication Data

US 2014/0083266 A1 Mar. 27, 2014

Related U.S. Application Data

(60) Provisional application No. 61/473,826, filed on Apr. 11, 2011.

(30) Foreign Application Priority Data

May 16, 2011 (BE) .................................. 2011/0295

(51) Int. Cl.
*B26D 1/36* (2006.01)
*B26D 7/06* (2006.01)
(Continued)

(52) U.S. Cl.
CPC ............. *B26D 7/0691* (2013.01); *B26D 1/36* (2013.01); *B26D 1/40* (2013.01); *B26D 5/08* (2013.01);
(Continued)

(58) Field of Classification Search
CPC .......... B26D 7/0691; B26D 1/36; B26D 5/08; Y10T 83/04; Y10T 83/148; Y10T 83/6473
(Continued)

(56) References Cited

U.S. PATENT DOCUMENTS

| | | | |
|---|---|---|---|
| 2,660,208 | A | 11/1953 | Calkins et al. |
| 2,859,784 | A | 11/1958 | Winslow et al. |

(Continued)

FOREIGN PATENT DOCUMENTS

| | | |
|---|---|---|
| JP | 45-10592 | 10/1965 |
| JP | 55-128406 | 3/1980 |

(Continued)

OTHER PUBLICATIONS

The International Bureau of WIPO, International Preliminary Report on Patentability and Written Opinion, dated Oct. 15, 2013, International Application No. PCT/EP2012/056404, Applicant, FAM (7 pages).

(Continued)

*Primary Examiner* — Omar Flores Sanchez
(74) *Attorney, Agent, or Firm* — Koppel, Patrick, Heybl & Philpott

(57) ABSTRACT

Apparatus for cutting products, comprising: a base; a cutting head rotatably fitted to the base; an impeller adapted for rotating concentrically within the cutting head to urge products fed into the cutting head towards the circumference of the cutting head by means of centrifugal force; an impeller drive mechanism for driving the rotation of the impeller at an impeller rotational speed setting the centrifugal force; and a cutting head drive mechanism for driving the rotation of the cutting head at a cutting head rotational speed which is greater than the impeller rotational speed.

13 Claims, 20 Drawing Sheets

(51) Int. Cl.
*B26D 1/40* (2006.01)
*B26D 5/08* (2006.01)

(52) U.S. Cl.
CPC .............. *Y10T 83/04* (2015.04); *Y10T 83/148* (2015.04); *Y10T 83/6473* (2015.04)

(58) Field of Classification Search
USPC ....... 83/403, 564, 553, 591, 698.41, 699.51, 83/663, 664, 932; 99/564, 553
See application file for complete search history.

(56) References Cited

U.S. PATENT DOCUMENTS

| | | | | | |
|---|---|---|---|---|---|
| 3,123,114 | A * | 3/1964 | Andrews et al. | A23N 1/003 99/496 |
| 4,134,205 | A | 1/1979 | Heling | |
| 4,301,846 | A | 11/1981 | Berggren | |
| 4,604,925 | A | 8/1986 | Wisdom | |
| 4,796,818 | A | 1/1989 | Thoma | |
| 4,972,888 | A * | 11/1990 | Dean | B27L 11/02 144/172 |
| 5,694,824 | A * | 12/1997 | Jacko | B26D 1/03 83/403 |
| 6,536,691 | B2 * | 3/2003 | Prewitt | A01J 27/04 241/101.01 |
| 6,655,615 | B1 * | 12/2003 | Hartmann | A23N 1/02 241/71 |
| 2005/0223864 | A1 | 10/2005 | Hemelrijk | |

FOREIGN PATENT DOCUMENTS

| | | |
|---|---|---|
| JP | 61-173893 | 11/1985 |
| JP | 04-183363 | 3/1992 |
| WO | 02068122 | 9/2002 |

OTHER PUBLICATIONS

The International Bureau of WIPO, International Preliminary Report on Patentability and Written Opinion, dated Oct. 15, 2013, International Application No. PCT/EP2012/056401, Applicant, FAM (7 pages).
European Patent Office International Search Report dated Aug. 31, 2012, International Application No. PCT/EP2012/056404 (3 pages).
Belgian Search Report dated Aug. 3, 2012, for Belgian Patent Application No. BE 201100295 (9 pages).
European Patent Office International Search Report dated Aug. 14, 2012, International Application No. PCT/EP2012/056401 (3 pages).
Russian Office Action for Russian Patent Application No. 2013148635 dated Mar. 29, 2016.

* cited by examiner

APPARATUS AND METHOD FOR CUTTING PRODUCTS

TECHNICAL FIELD

The present invention relates to an apparatus for cutting products, such as for example food products or ingredients for pharmaceuticals or the like, comprising an impeller which can rotate concentrically within a cutting head to impart centrifugal force to the products to be cut.

The present invention further relates to a method for cutting a product in which the product is fed to a cutting head in which an impeller rotates concentrically to impart centrifugal force to the product.

BACKGROUND ART

An apparatus for cutting food products of the type comprising an impeller rotating inside a cutting head is known for example from U.S. Pat. No. 6,968,765. The cutting head is a stationary drum which is fitted with multiple cutting stations. Products cut with this technology include potato chips, cheese shreds, vegetable slicing, nut slicing and countless others. Centrifugal force is required to apply pressure to the product for stability when it passes the blades in the cutting stations. The centrifugal force is specific to the product, but it is known that too high centrifugal force can produce excess friction and compression on the product and that too low centrifugal force can cause poor knife engagement resulting in damage of the product. The desired cutting velocity is also specific for a given product.

In this type of apparatus, the cutting velocity is directly related to centrifugal force as both depend directly on the rotational speed of the impeller. However, the optimal impeller rotational speed from a viewpoint of centrifugal force is often different from the optimal impeller rotational speed from a viewpoint of cutting velocity. In those cases, upon selecting the impeller rotational speed a trade-off has to be made between more optimal centrifugal force and more optimal cutting velocity.

U.S. Pat. No. 4,604,925 discloses an apparatus of this type in which the cutting head is cutting head is not stationary as in U.S. Pat. No. 6,968,765 but can be rotated in the same direction as the impeller at a slower speed.

DISCLOSURE OF THE INVENTION

It is an aim of the present invention to provide an apparatus for cutting products of the type comprising an impeller rotating inside a cutting head, with which the cutting operation can be improved for at least some products.

This aim is achieved according to the invention with an apparatus showing the technical characteristics of the first independent claim.

It is another aim of the present invention to provide a method for cutting products by means of a cutting head in which an impeller rotates, with which the cutting operation can be improved for at least some products.

This aim is achieved according to the invention with a method comprising the steps of the second independent claim.

As used herein, "rotational speed" is intended to mean the speed at which an object rotates around a given axis, i.e. how many rotations the object completes per time unit. A synonym of rotational speed is speed of revolution. Rotational speed is commonly expressed in RPM (revolutions per minute).

As used herein, "cutting velocity" is intended to mean the speed at which a cutting element cuts through a product or alternatively states the speed at which a product passes a cutting element. Cutting velocity is commonly expressed in m/sec.

As used herein, a "cutting element" is intended to mean any element which is configured for cutting a particle or a piece from an object or otherwise reducing the size of the object, such as for example a knife, a blade, a grating surface, a cutting edge, a milling element, a comminuting element, a cutting element having multiple blades, etc., the foregoing being non-limiting examples.

According to the invention, the impeller is rotated by means of an impeller drive mechanism at an impeller rotational speed, which sets the centrifugal force imparted to the product. The cutting head is not stationary as in the prior art document U.S. Pat. No. 6,968,765 but can be rotated by means of a cutting head drive mechanism at a cutting head rotational speed. The cutting head rotational speed is determined such with respect to the impeller rotational speed that the product is cut by the at least one cutting element at a predetermined cutting velocity. By determining the cutting head rotational speed in relation to the impeller rotational speed, the cutting velocity is set.

According to the invention, the centrifugal force and the cutting velocity can be made independent from each other. The centrifugal force is proportional to the impeller rotational speed. The cutting velocity is dependent on the impeller rotational speed as well as the cutting head rotational speed. As a result, by establishing these rotational speeds, both the centrifugal force and the cutting velocity can be optimized for the product which is to be cut and the need for making a trade-off like in the prior art can be avoided.

According to the invention, the apparatus is configured for rotating the cutting head and the impeller in the same rotational direction, which is the rotational direction towards which the cutting element(s) of the cutting head are oriented to impart cutting action, with the cutting head rotating at a greater rotational speed than the impeller. The cutting velocity is thus proportional to the cutting head rotational speed minus the impeller rotational speed. It has been found that for at least some products, the cutting operation can be improved by rotating the cutting head and the impeller in the same rotational direction with the cutting head rotating at a greater rotational speed than the impeller, resulting in e.g. less scrap, smoother cuts, less damage to the product, reduced starch loss (for potatoes), improved shred quality and/or more consistent shreds (e.g. for cheese) etc. It has further been found that, surprisingly, wear on the cutting elements may affect the quality of the cut to a lesser extent, i.e. relatively dull cutting elements may still yield a cutting operation of sufficient quality, so that with the solution according to the invention, the life of the cutting elements can be extended.

Another advantage of the invention is that the cutting velocity and the centrifugal force can be set to any desired value. The impeller rotational speed determines the centrifugal force at which the product is cut. The impeller rotational speed can be set to any desired value. The cutting velocity is proportional to the cutting head rotational speed minus the impeller rotational speed. As a result, the only requirement to achieve cutting operation is that the cutting head is rotated at a greater speed than the impeller; there is no upper limit for the cutting head rotational speed. This means that the cutting velocity can be set anywhere from 0 to infinity, which is important since lower cutting velocities may be desirable for products which require a more gentle cutting operation and higher cutting velocities may be desirable if a high throughput is required. In this aspect, it further is important to note that, since the cutting head is rotated in the direction of the cutting action of the cutting elements, the air resistance that the cut product experiences when exiting the cutting head at one of the cutting elements presses the cut product onto the outside of the cutting head, rather than pulling the product away from the outside. This means that the cut product exits the cutting head in substantially straight pieces and tearing or "feathering" of the cut product as a result of tensile stress can be avoided.

In preferred embodiments, the impeller drive mechanism and the cutting head drive mechanism are provided with controls for adjusting the the impeller rotational speed and the cutting head rotational speed within respectively a first range and a second range. In this way, the cutting velocity and the centrifugal force can be established for a wide range of products. The controls can comprise a user interface, by means of which the user can set the impeller rotational speed and the cutting head rotational speed. The controls can also be adjusted by means of another device, such as for example a PLC which takes a feedback input from sensors which sense for example temperature, product density, or other parameters, and on the basis thereof adjusts the rotational speeds. Another example is the use of the apparatus for cutting potato chips in combination with a fryer for frying the potato chips. In this case the controls can be adjusted on the basis of fryer requirements. One such requirement is for example a supply of potato chips to the fryer which is as uniform as possible, which means that the cutting apparatus has to be speeded up or slowed down to a given extent at times. Up to now, this speeding up or slowing down could lead to a significant amount of miscuts and product damage. With the apparatus of the invention, this can be minimised, as the centrifugal force and the cutting velocity can be optimised.

In preferred embodiments, the impeller drive mechanism comprises an impeller drive shaft by which the impeller is driven and the cutting head drive mechanism comprises a cutting head drive shaft by which the cutting head is driven, the cutting head drive shaft being hollow and the impeller drive shaft being rotatably mounted within the cutting head drive shaft. This has the advantage that the impeller and the cutting head are driven from the same side, e.g. the bottom side, leaving the top side unobstructed for feeding the product into the cutting head.

In preferred embodiments, the drive mechanisms of the impeller and the cutting head can have separate motors, so that the rotation of the impeller is entirely independent from the rotation of the cutting head. This has the advantage that the cutting velocity is totally independent of the centrifugal force.

In preferred embodiments wherein the apparatus has separate motors, the impeller is directly driven by the impeller motor of the impeller drive mechanism and the cutting head is directly driven by the cutting head motor of the cutting head drive mechanism. This has the advantages that any intermediate drive components can be avoided and the construction can be simplified. Preferably, in such embodiments, the base comprises a post with an impeller arm carrying the impeller motor with the impeller and a cutting head arm carrying the cutting head motor with the cutting head, the cutting head arm being movably mounted to the post in such a way that the cutting head can be removed from around the impeller. Preferably, in such embodiments, the rotation of the impeller inside the cutting head is stabilised by means of a spring-loaded pin on the impeller which fits into a tapered hole in the centre of the cutting head, or vice versa.

In other embodiments, the wherein the impeller drive mechanism and the cutting head drive mechanism can have a shared motor, which drives the rotation of both the impeller and the cutting head, and a gearbox, by means of which the difference between the impeller rotational speed and the cutting head rotational speed can be set. The gearbox can have multiple gears, so that different ratios between the rotational speeds can be set.

In preferred embodiments, the cutting head and the impeller can be oriented to rotate around a vertical axis or a horizontal axis. However, other angles with respect to horizontal are also possible.

In preferred embodiments, the cutting head and the impeller are mounted on a tiltable part of the base, by means of which the rotation axis of the cutting head and the impeller can be tilted to different angles. In this way, the orientation of the rotation axis can be adapted.

In preferred embodiments, at least one of the impeller drive mechanism and the cutting head drive mechanism is further adapted for driving the impeller, resp. the cutting head, to make it rotate in a second rotational direction opposite said first rotational direction.

BRIEF DESCRIPTION OF THE DRAWINGS

The invention will be further elucidated by means of the following description and the appended figures.

MODES FOR CARRYING OUT THE INVENTION

Figure 1:
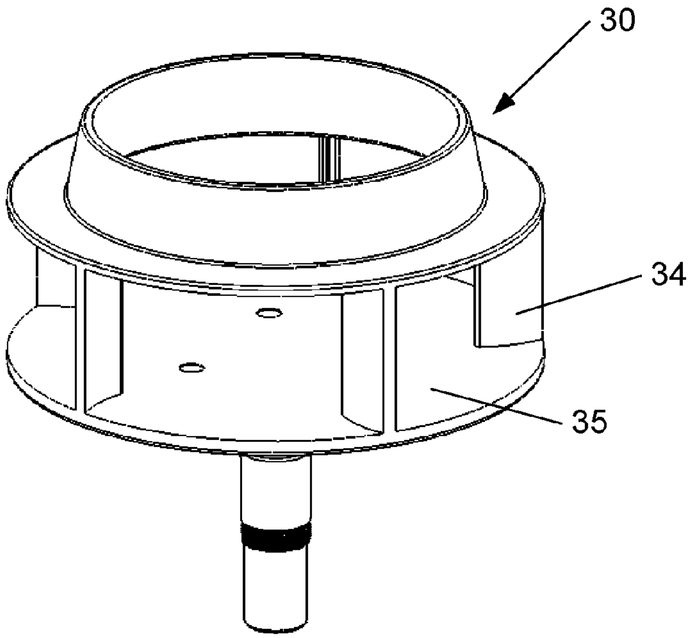
Fig. 1 (prior art)
FIG. 1 shows a perspective view of an impeller of a prior art cutting apparatus.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as “preferred” are to be construed as exemplary manners in which the invention may be implemented rather than as limiting the scope of the invention.

The term “comprising”, used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression “a device comprising A and B” should not be limited to devices consisting only of components A and B, rather with respect to the present invention, the only enumerated components of the device are A and B, and further the claim should be interpreted as including equivalents of those components.

Figure 2:
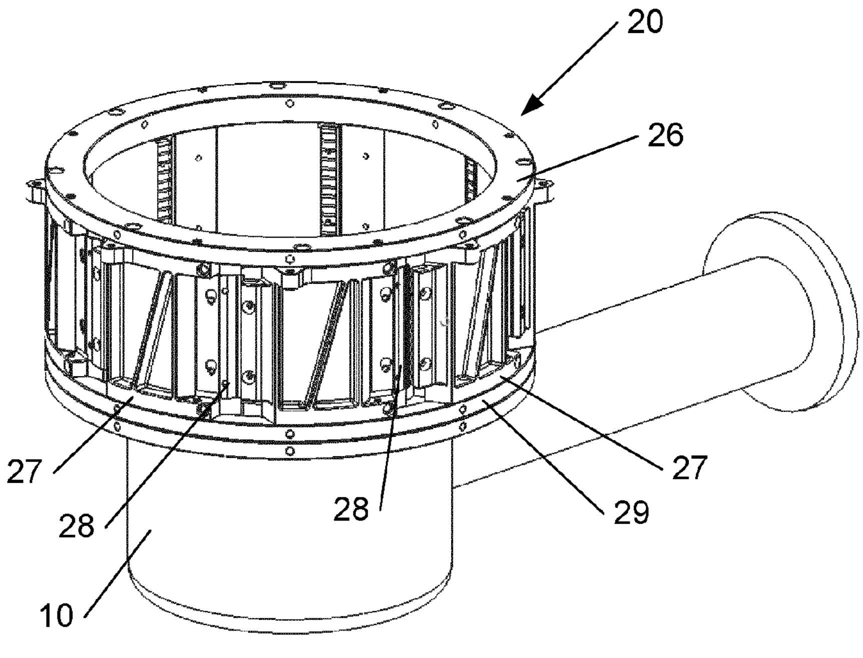
Fig. 2 (prior art)
FIG. 2 shows a perspective view of a cutting head of a prior art cutting apparatus.
Figure 3:
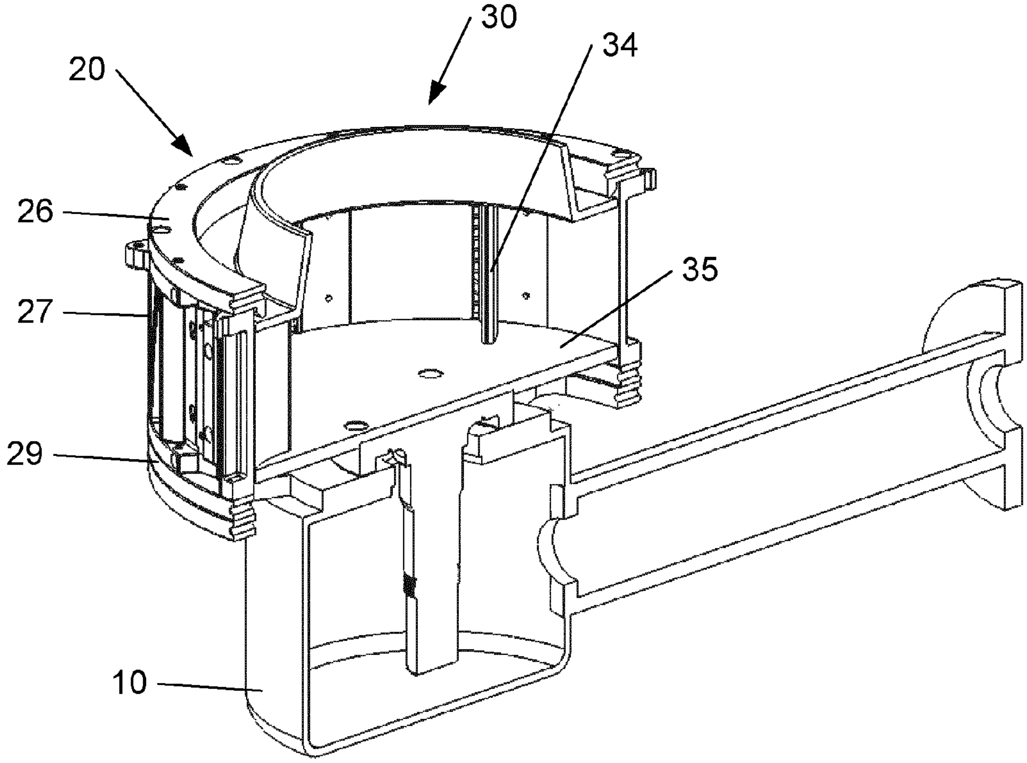
Fig. 3 (prior art)
FIG. 3 shows a cross sectional perspective view of the impeller and cutting head of the prior art apparatus, mounted inside each other.

FIGS. 1-3 respectively show a prior art impeller 30 and cutting head 20. The impeller 30 has a bottom plate 35 which is releasably fixed to a drive shaft of a prior art cutting apparatus for rotation inside the cutting head 20. The cutting head 20 is a cylindrical assembly comprising a top ring 26, a bottom ring 29 and a plurality of cutting stations 27 held between these rings, each comprising one cutting element 28. The assembly is held together by a number of bolts and fixed to the frame base 10 of the machine. The cutting stations 27 are tiltable for adjusting the gap between the cutting element 28 and an opposite part at the rear of the subsequent cutting station, i.e. for adjusting the thickness of the part which is cut off. The top sides of the cutting head 20 and impeller 30 are open. In use, product to be cut is supplied into the cutting head from this open top side, lands on the bottom plate 35 of the impeller and is moved towards the cutting elements 28 firstly by centrifugal force, which is imparted to the product by the rotation of the impeller 30, and secondly by the paddles 34 of the impeller. In the prior art cutting apparatus, the cutting head 20 is stationary.

The cutting apparatus shown in FIGS. 4-8 is a first embodiment of a cutting apparatus according to the invention. It comprises a base 100 which carries a rotatable cutting head 200 and an impeller 300, adapted for rotating concentrically within the cutting head. An impeller drive mechanism, which is constituted by an impeller drive shaft 301, drive belt 302 and motor 303, is provided for driving the rotation of the impeller 300. A cutting head drive mechanism, which is constituted by a cutting head drive shaft 201, drive belt 202 and motor 203, is provided for driving the rotation of the cutting head. The impeller drive shaft and the cutting head drive shaft are concentrical. The cutting head drive shaft 201 which drives the cutting head 200 is rotatably mounted by means of bearings 104, 105 inside a stationary outer bearing housing 103, which forms part of the base 100. The impeller drive shaft 301 which drives the impeller is rotatably mounted by means of bearings 106, 107 inside the cutting head drive shaft 201. As shown, these bearings 104-107 are tapered roller bearings, slanting in opposite directions, which is preferred in view of withstanding the forces which occur during operation of the apparatus. Alternatively, angular contact bearings could be used, or any other bearings deemed suitable by the person skilled in the art.

The base 100 comprises an arm 101, which is rotatably mounted on a post 102, so that the cutting head 200 and impeller 300 can be rotated away from the cutting position for cleaning, maintenance, replacement etc.

Figure 4:
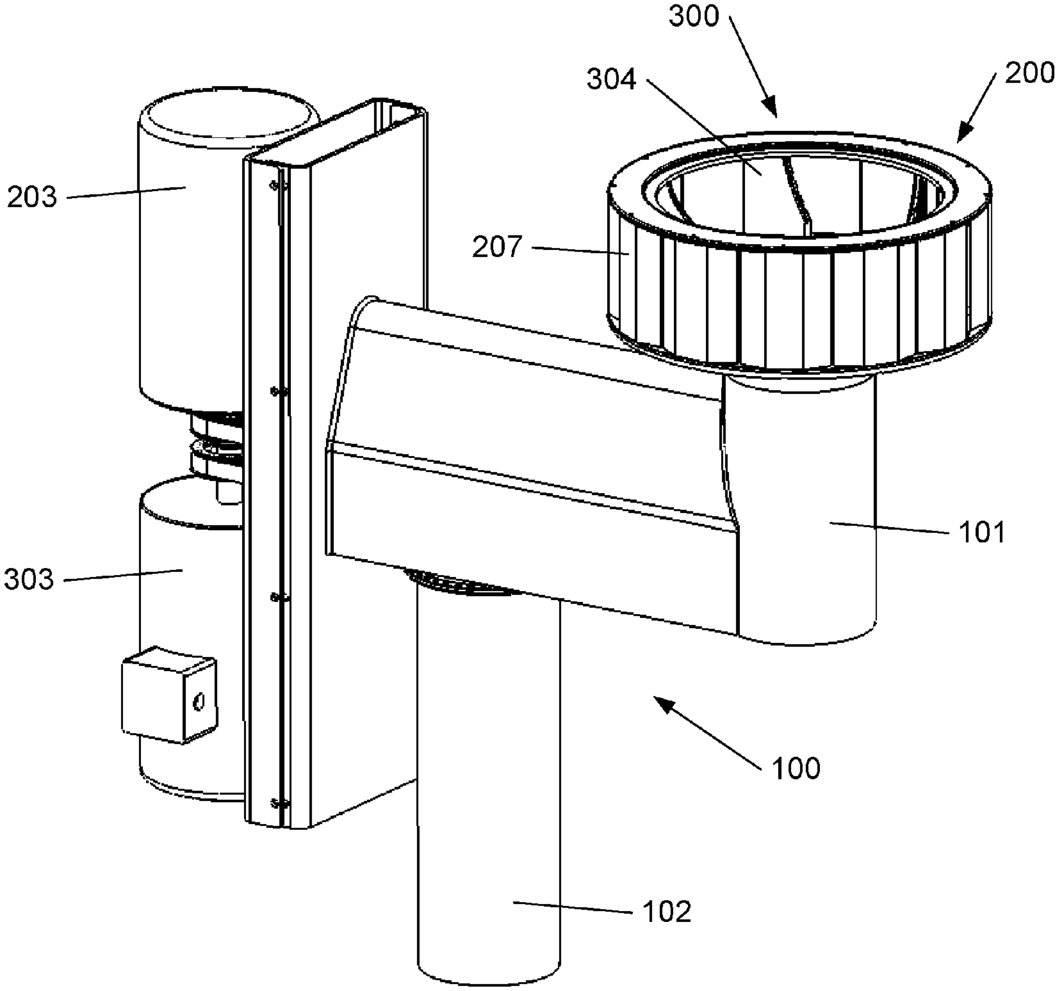
FIG. 4 shows a perspective view of a first preferred embodiment of a cutting apparatus according to the invention.
Figure 5:
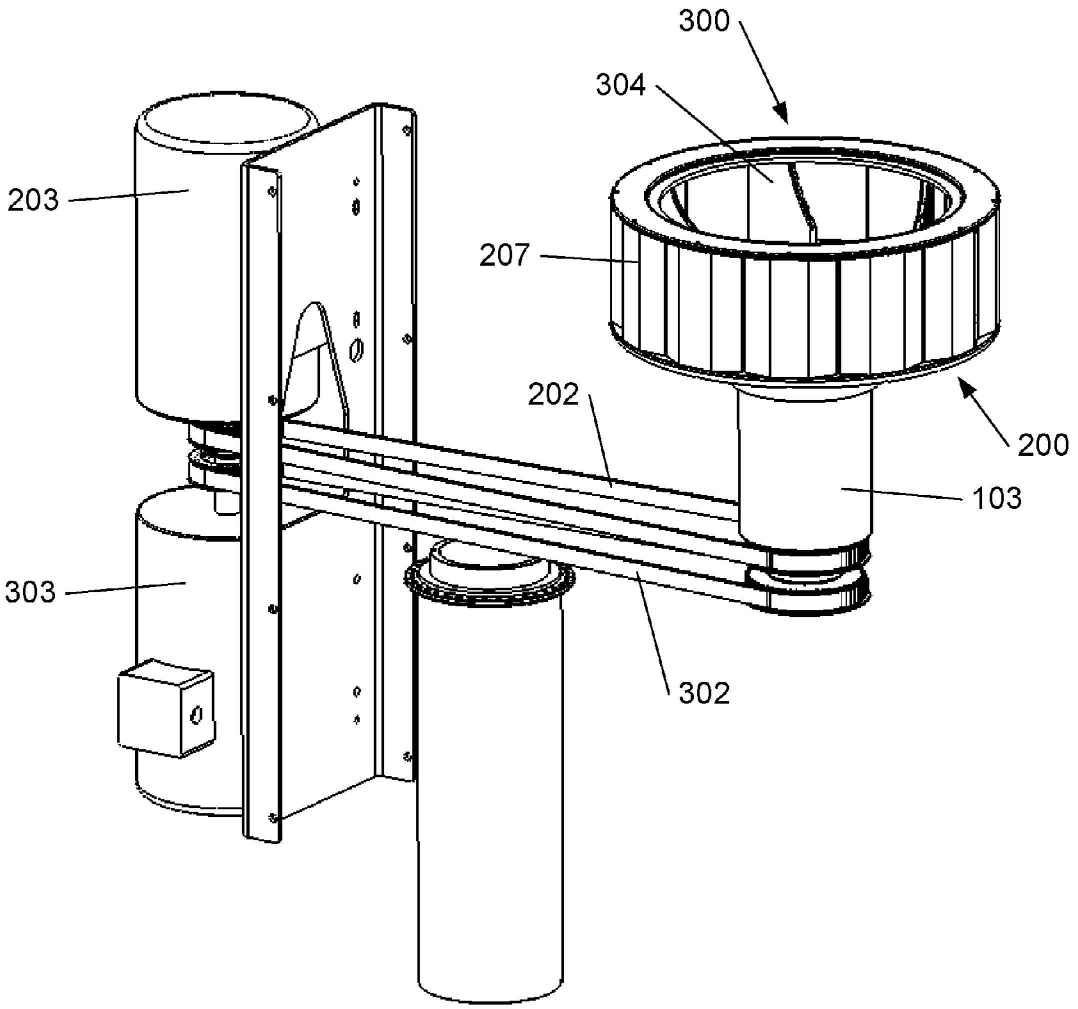
FIG. 5 shows a perspective view of the first embodiment of FIG. 4 with some parts removed in order to show its operation.
Figure 6:
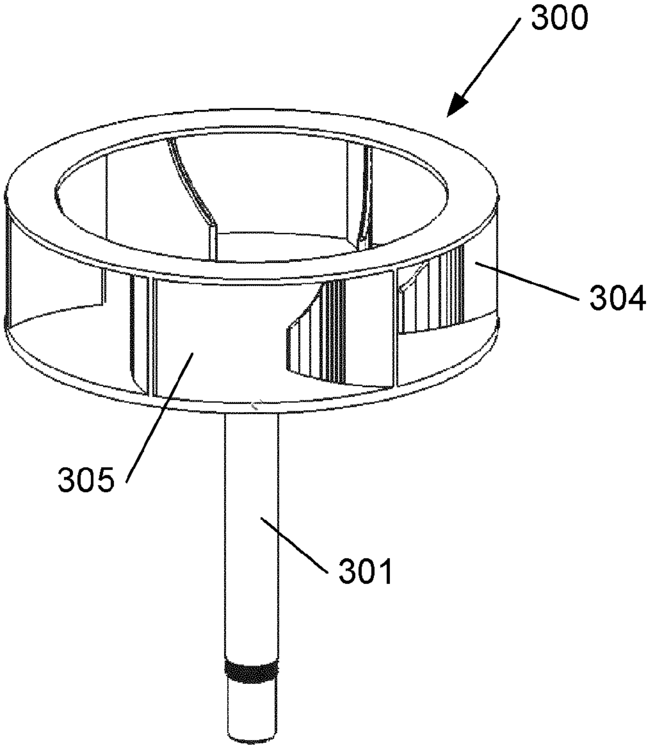
FIG. 6 shows a perspective view of the impeller of the first embodiment of FIG. 4.
Figure 7:
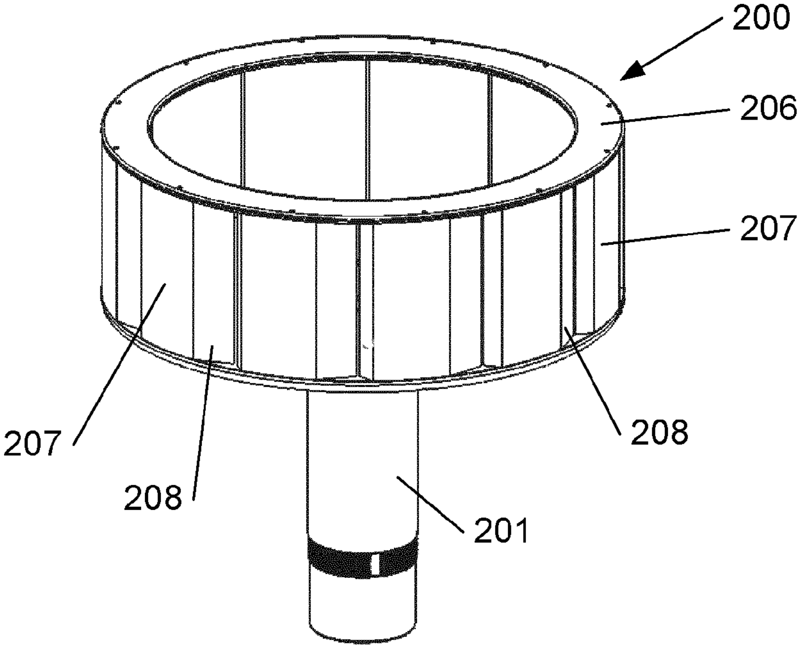
FIG. 7 shows a perspective view of the cutting head of the first embodiment of FIG. 4.
Figure 8:
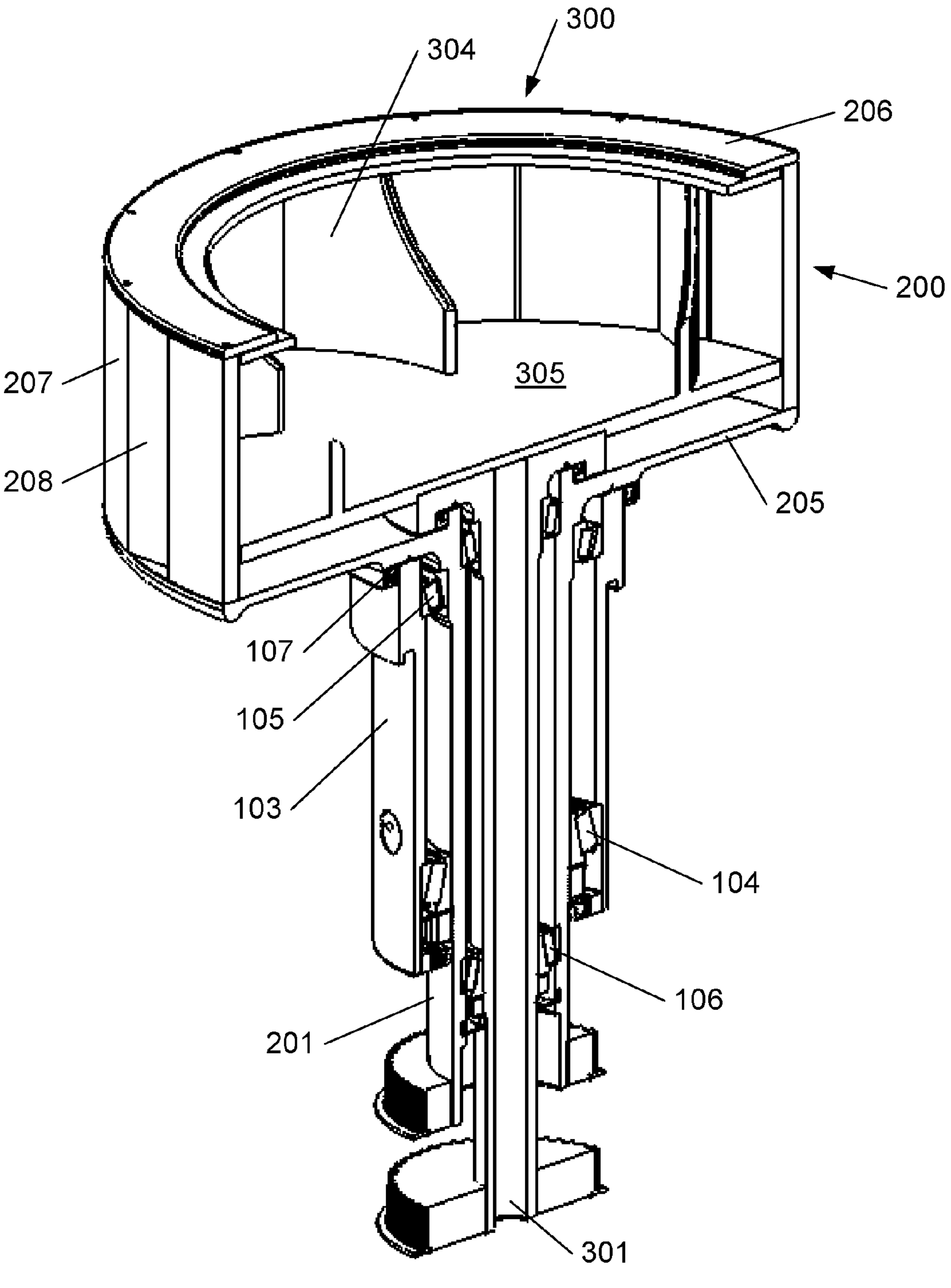
FIG. 8 shows a cross sectional perspective view of the cutting head, the impeller and drive shafts of the first embodiment of FIG. 4.

FIGS. 6-8 respectively show the impeller 300 and cutting head 200 fitted on the apparatus of FIGS. 4-5. The impeller 300 is releasably fixed to the impeller drive shaft 301 for rotation inside the cutting head 200. The cutting head 200 is a cylindrical assembly comprising a top ring 206, a bottom plate 205 and a plurality of cutting stations 207 held between these two parts, each comprising one cutting element 208. The assembly is held together by a number of bolts and releasably fixed to the cutting head drive shaft 201. The cutting stations 207 are tiltable for adjusting the gap between the cutting element 208 and an opposite part at the rear of the subsequent cutting station, i.e. for adjusting the thickness of the part which is cut off. The top sides of the cutting head 200 and impeller 300 are open. In use, product to be cut is supplied into the cutting head from this open top side, lands on the bottom plate 305 of the impeller and is moved towards the cutting elements 208 firstly by centrifugal force, which is imparted to the product by the rotation of the impeller 300, and secondly by the paddles 304 of the impeller.

The cutting head 200 is fitted with cutting elements 208, for example blades which make straight cuts in the product, for example to make potato chips. As an alternative, corrugated cutting elements could be fitted in order to make for example crinkle cut potato chips or shreds.

Figure 9:
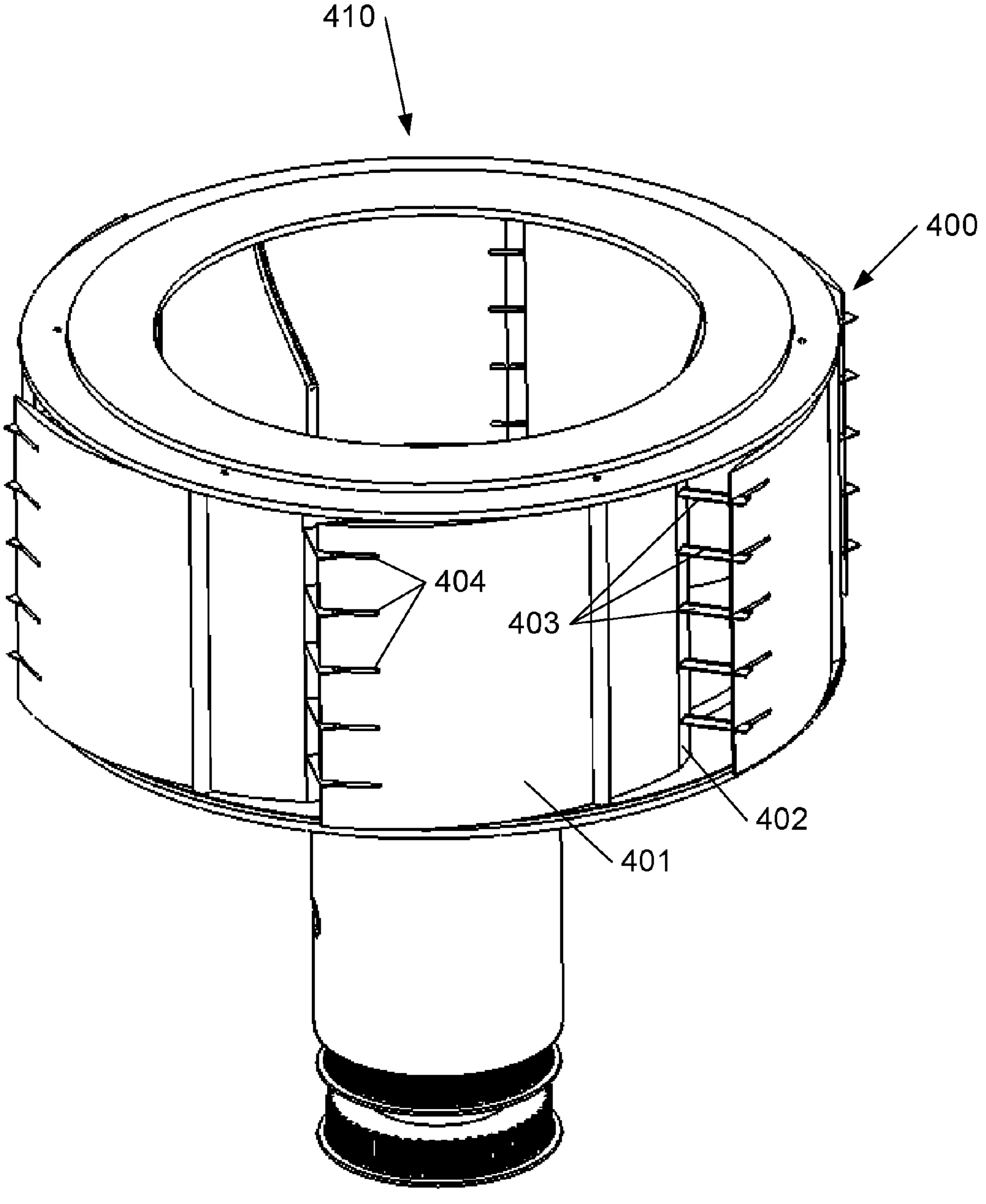
FIG. 9 shows a perspective view of an alternative cutting head and impeller which can be used on the cutting apparatus of FIGS. 4-5.
Figure 10:
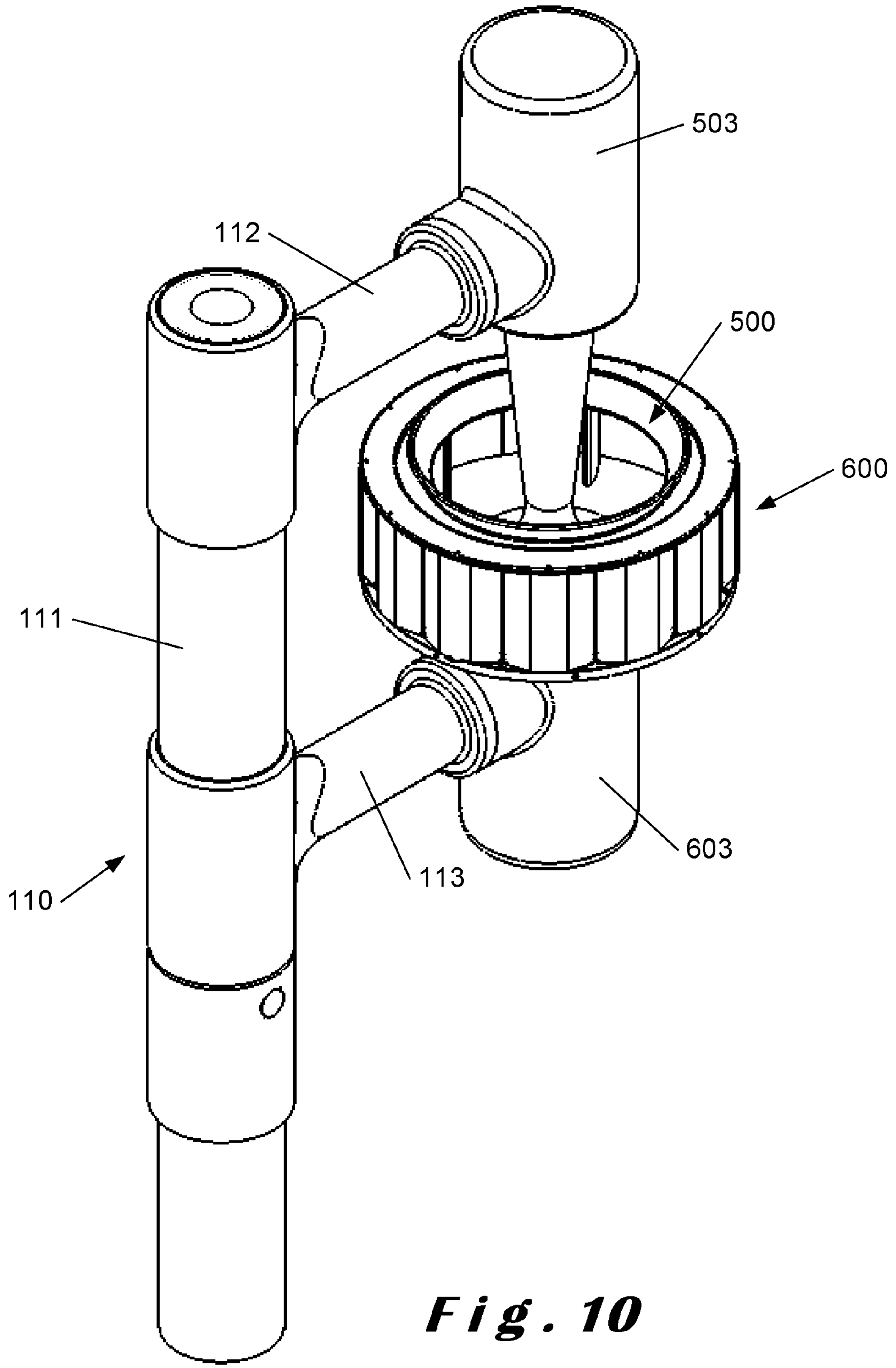
FIG. 10 shows a perspective view of a second preferred embodiment of a cutting apparatus according to the invention.
Figure 11:
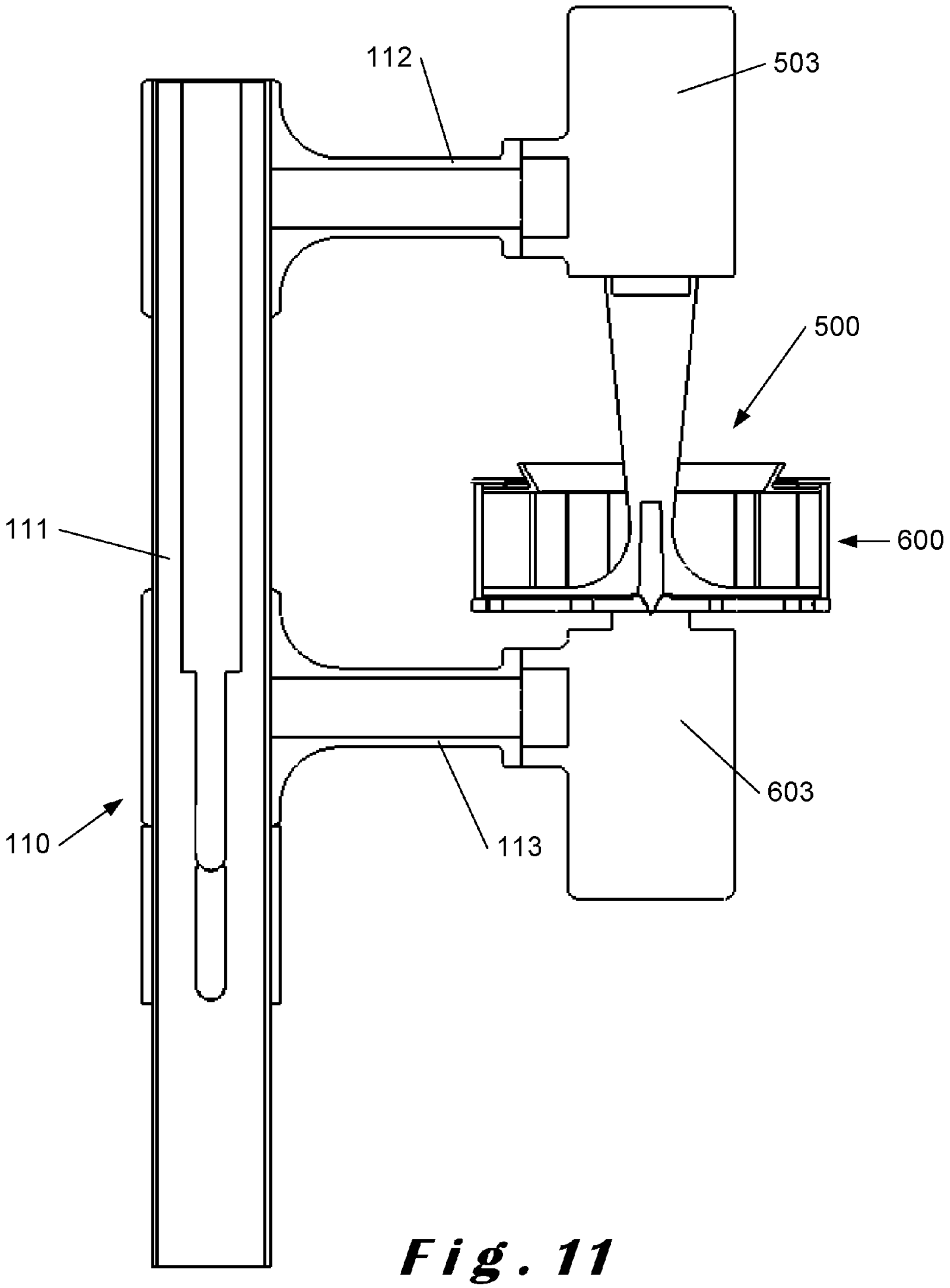
FIG. 11 shows a cross sectional view of the second embodiment of FIG. 10.
Figure 12:
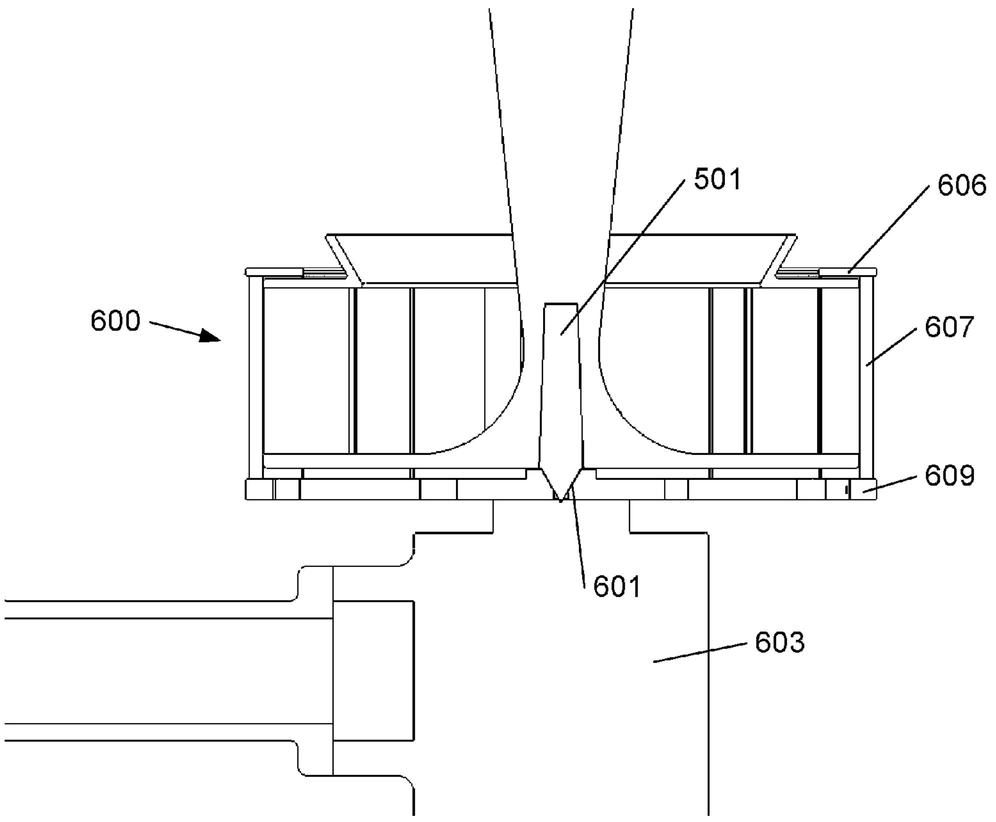
FIG. 12 shows a detail of FIG. 11.
Figure 13:
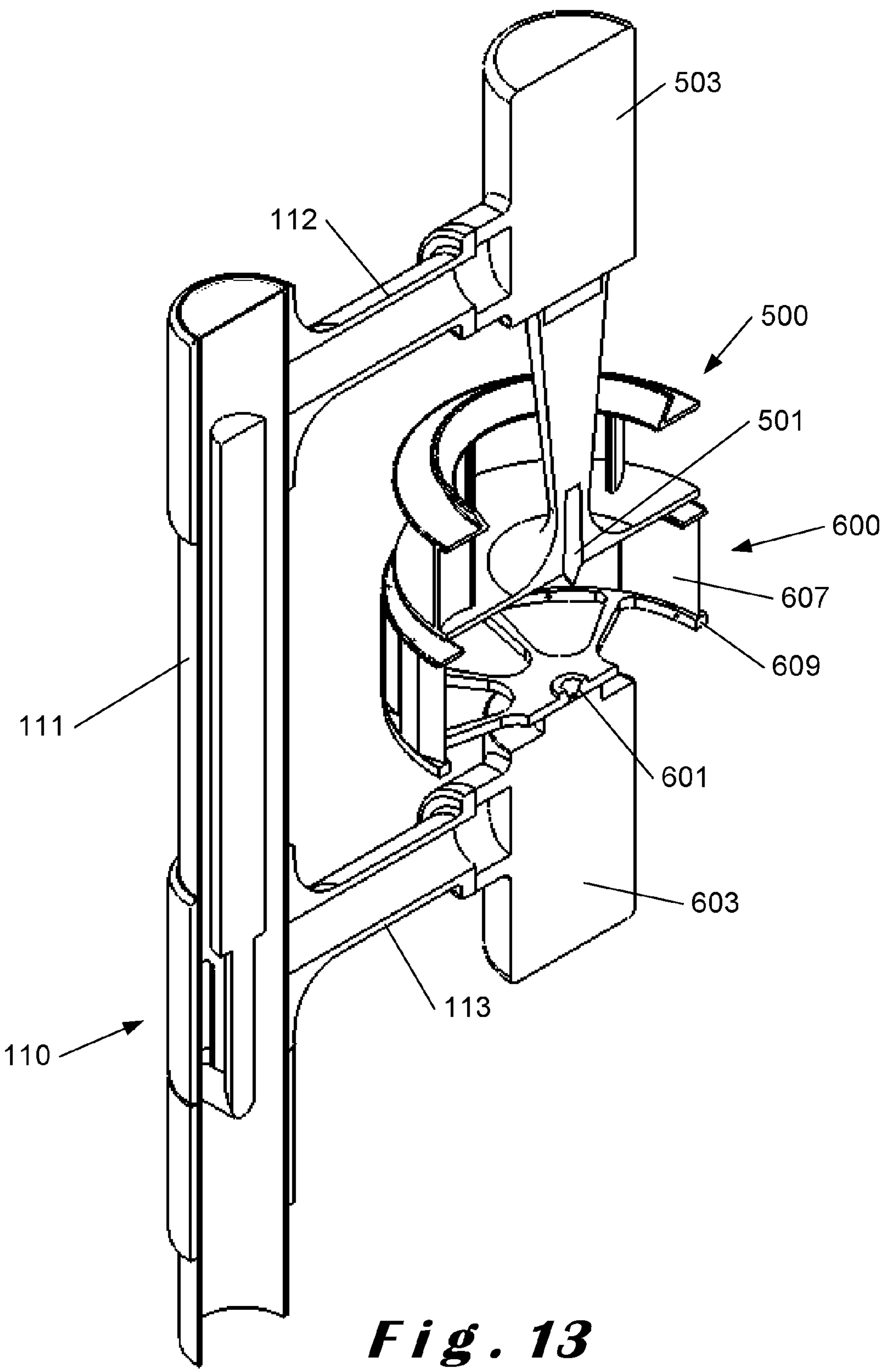
FIG. 13 shows a cross sectional perspective view of the second embodiment of FIG. 10, with the cutting head lowered for removal from the impeller.

FIG. 9 shows an alternative embodiment of a cutting head 400 with an adapted impeller 410 which is also capable of being used on the apparatus of FIGS. 4-5. The cutting head and impeller again are both rotatable and are driven by means of concentrical shafts in the same way as described above. The cutting stations 401 in this embodiment comprise each a larger blade 402 and a number of smaller, so-called julienne tabs 403 extending at an angle thereto, in particular substantially perpendicular thereto. In the embodiment shown, the julienne tabs 403 are welded onto the larger blades 402, but they could also be removably fixed thereto. In particular, in the embodiment shown the julienne tabs 403 are fixed to and extend perpendicular to the bevel of the larger blades 402, but they could also be fixed to the larger blades 402 behind the bevel. The front cutting edges of the julienne tabs 403 are slightly behind the front cutting edge of the larger blade 402, all at the same distance. Alternatively, they could also be located at varying distances from the front cutting edge of the larger blade 402, for example in a staggered or alternating configuration. The julienne tabs 403 are stabilised by means of slots 404 in the subsequent cutting station, so that during operation stresses can be relieved and the desired cut can be better maintained. The slots 404 extend a given distance into the rear end of the cutting stations 401 to accommodate for the variable positions of the julienne tabs 403 upon pivoting the cutting stations 401 for varying the gap. With this cutting head 400, the product is cut in two directions at once. It can for example be used to cut French fries from potatoes or to cut lettuce.

In further alternatives, cutting stations can be used with cutting edges for milling or comminuting products (e.g. salt, spices) or viscous liquids (e.g. butters, spreads). With these cutting stations, the apparatus can also be used for manufacturing pharmaceutical products like for example ointments.

In further alternatives, cutting stations can be used with grating surfaces for making grated cheese, or with any other cutting elements known to the person skilled in the art. The cutting apparatus of FIGS. 4-5 can even be used with the prior art cutting head and impeller of FIGS. 1-3.

Figure 21:
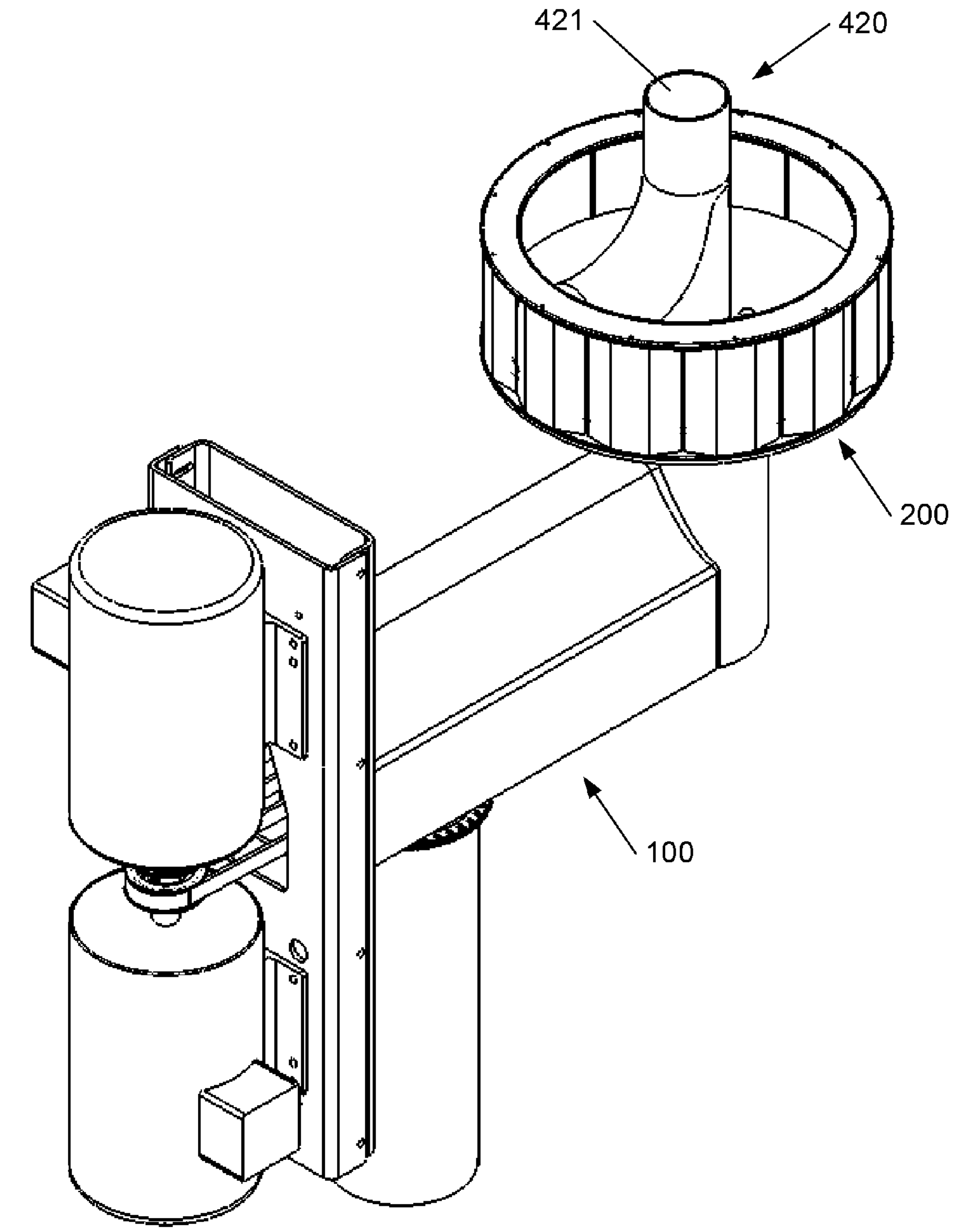
FIG. 21 shows a perspective view of a sixth preferred embodiment of a cutting apparatus according to the invention.
Figure 22:
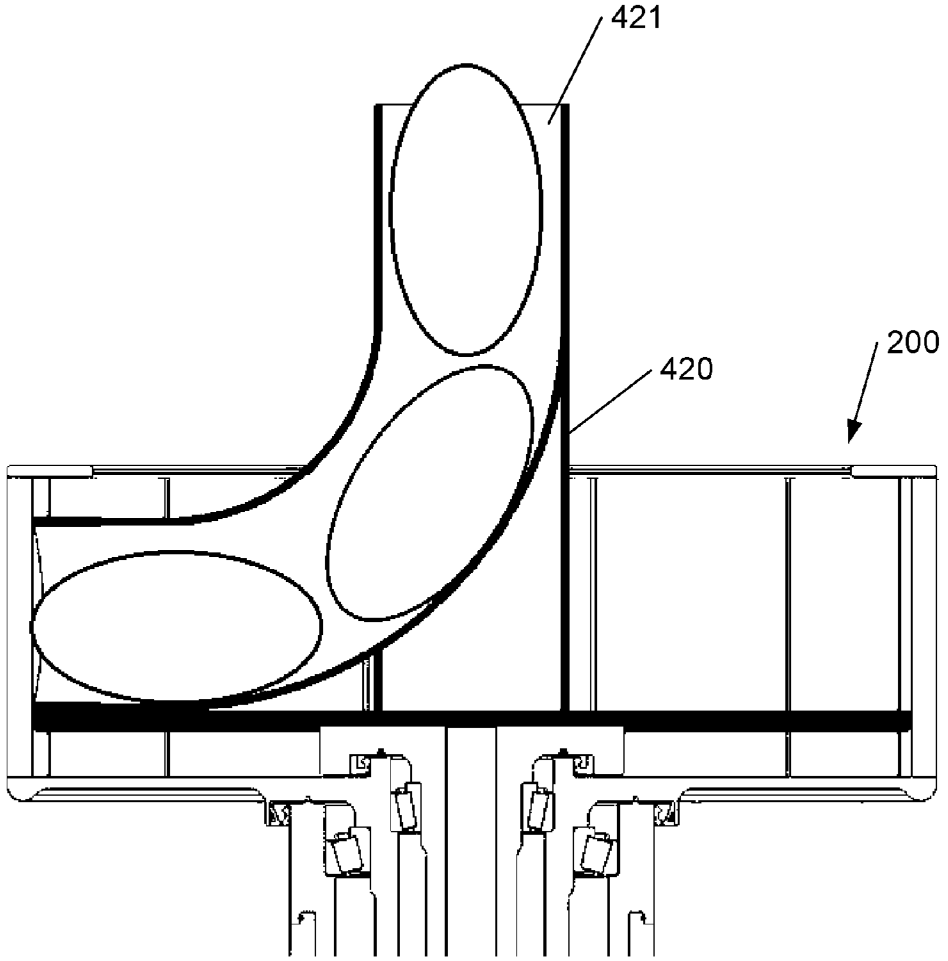
FIG. 22 shows a cross sectional view of the cutting head and impeller of the sixth embodiment of FIG. 21.

FIGS. 21 and 22 show an alternative embodiment of an impeller 420 which can be used on the apparatus of FIGS. 4-5 with the same cutting head 200. The impeller 420 comprises a feed tube 421 which starts vertically in the centre of the impeller and bends towards the cutting head 200. This impeller 420 is intended for products for which it is desired to feed them towards the cutting head 200 in a directed way, such as, for example, products with an elongated shape of which it is desired their shorter sides face the cutting elements 208 and they are cut into chips having a more circular shape. The mouth of the feed tube can also be oriented at an angle with respect to the cutting elements 208, so that the products are cut into chips having a more oval shape. The impeller 420 is for example highly suitable for cutting larger, elongated potatoes into circular chips or for cutting onions into onion rings.

The cutting apparatus shown in FIGS. 10-14 has many features in common with the cutting apparatus shown in FIGS. 4-5. As a result, only the differences will be explained in detail.

The cutting apparatus shown in FIGS. 10-14 is mainly different in the driving mechanisms used to drive the impeller 500 and the cutting head 600. For both, an in line drive mechanism is used, i.e. the impeller 500 is directly fixed to the shaft of the motor 503 and the cutting head 600 is directly fixed to the shaft of the motor 603. This has the advantage that any intermediate drive components, such as the driving belts 202, 302 and the concentric shafts 201, 202 of the apparatus of FIGS. 4-5 are avoided, which simplifies the construction. The concentric rotation of the impeller 500 inside the cutting head 600 is stabilised by means of a spring-loaded pin 501 which fits into a tapered hole 601 in the centre of the cutting head 600.

The cutting head 600 is in this embodiment an assembly of a top ring 606, cutting stations 607 and a spider support 609 at the bottom. The cutting stations 607 are held between the top ring 606 and the spider support 609 like in the above described embodiment. The spider support 609 is used instead of a full bottom plate in order to save weight. The spider support can be connected to the shaft of the motor 603 by means of notches which are engaged by pins on the shaft. This can be a quick release engagement which can be fixed/loosened by for example turning the spider support 609 over +5°/−5° with respect to the motor shaft. Of course, the spider support 609 could also be bolted to the motor shaft, or releasably fixed by any other means known to the person skilled in the art.

Figure 14:
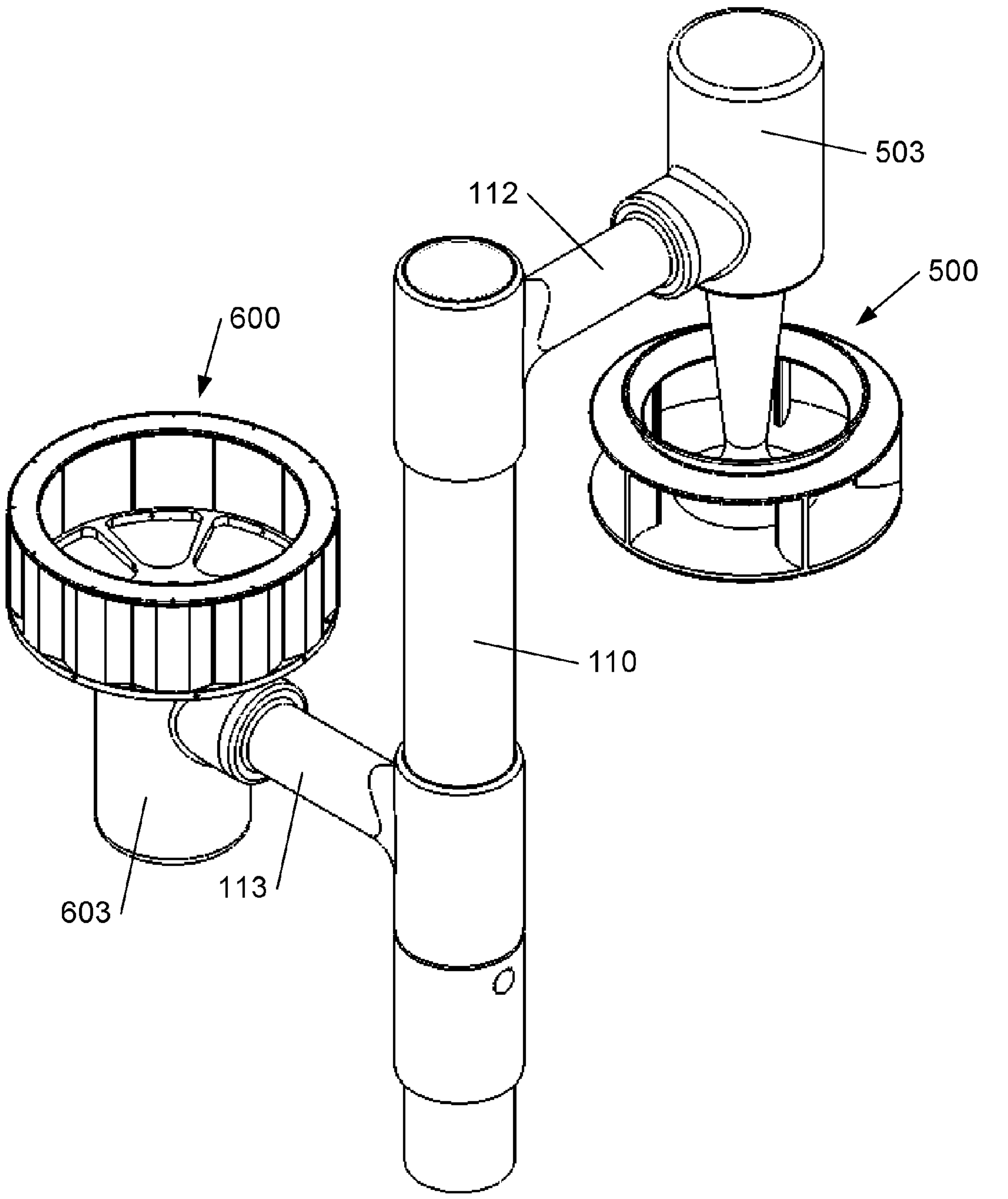
FIG. 14 shows a perspective view of the second embodiment of FIG. 10, with the cutting head lowered and rotated away from the impeller.

In this embodiment, the base 110 comprises a vertical post 111 with a fixed top arm 112 on which the impeller motor 503 is mounted with the shaft pointing downwards. The cutting head motor 603 is mounted on the post 111 with the shaft pointing upwards by means of a vertically movable and horizontally rotatable arm 113. In this way, the cutting head 600 can be removed from the impeller 500 for maintenance, replacement, etc. by subsequently moving the arm 113 downwards (FIG. 13) and rotating it in a horizontal plane (FIG. 14).

Figure 15:
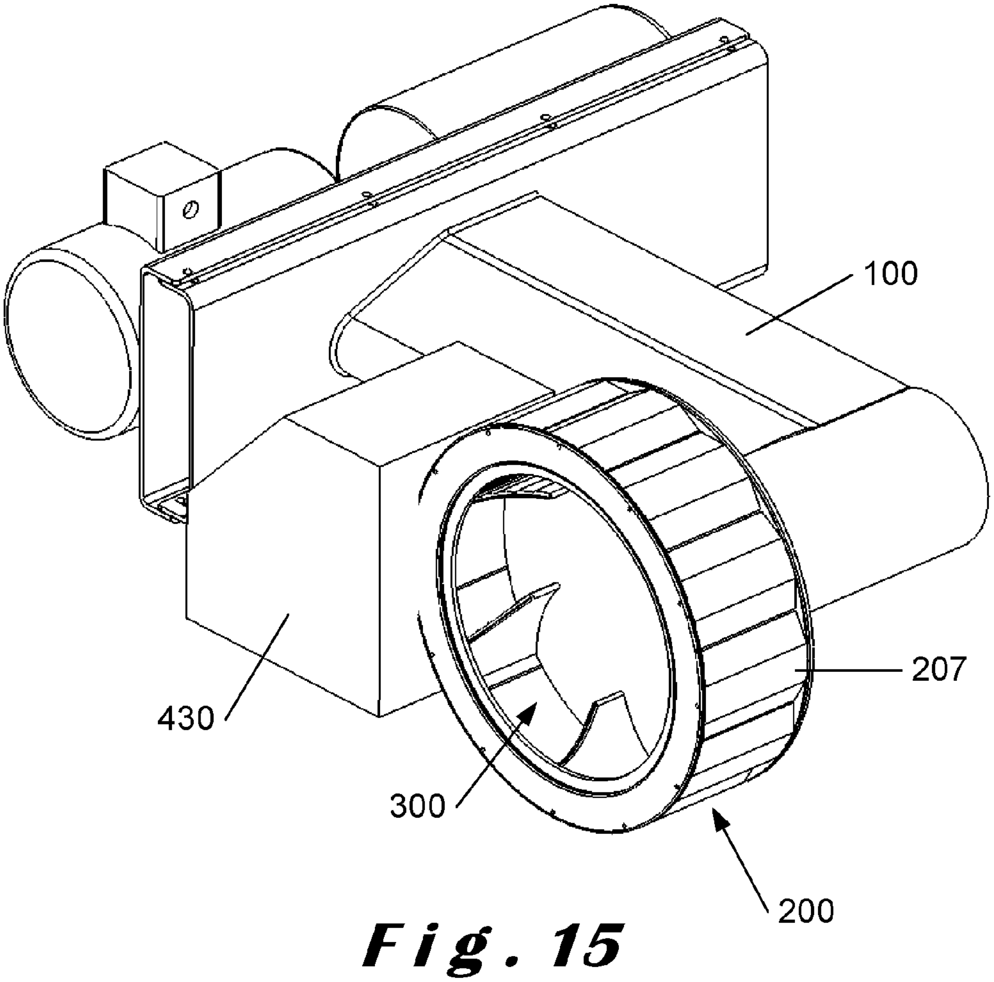
FIG. 15 shows a perspective view of a third preferred embodiment of a cutting apparatus according to the invention.

The cutting apparatus shown in FIG. 15 is the same as the one of FIGS. 4-5, but the cutting head 200 and the impeller 300 are oriented for rotation around a horizontal axis and are mounted adjacent a dicing unit 430. For dicing product by means of this apparatus, the cutting head 200 can here be locked to the base 100 by means of a releasable locking mechanism (not shown) to make it stationary. For dicing, the cutting stations 207 can all be tilted to a non-cutting position (zero gap) except for the one located at the dicing unit 430. A dicing unit is otherwise known in the art and therefore needs no further description here. So in this embodiment, the apparatus is convertible between a first mode of operation, namely with a stationary cutting head adjacent a dicing unit, and a second mode of operation with a rotating cutting head.

Figure 16:
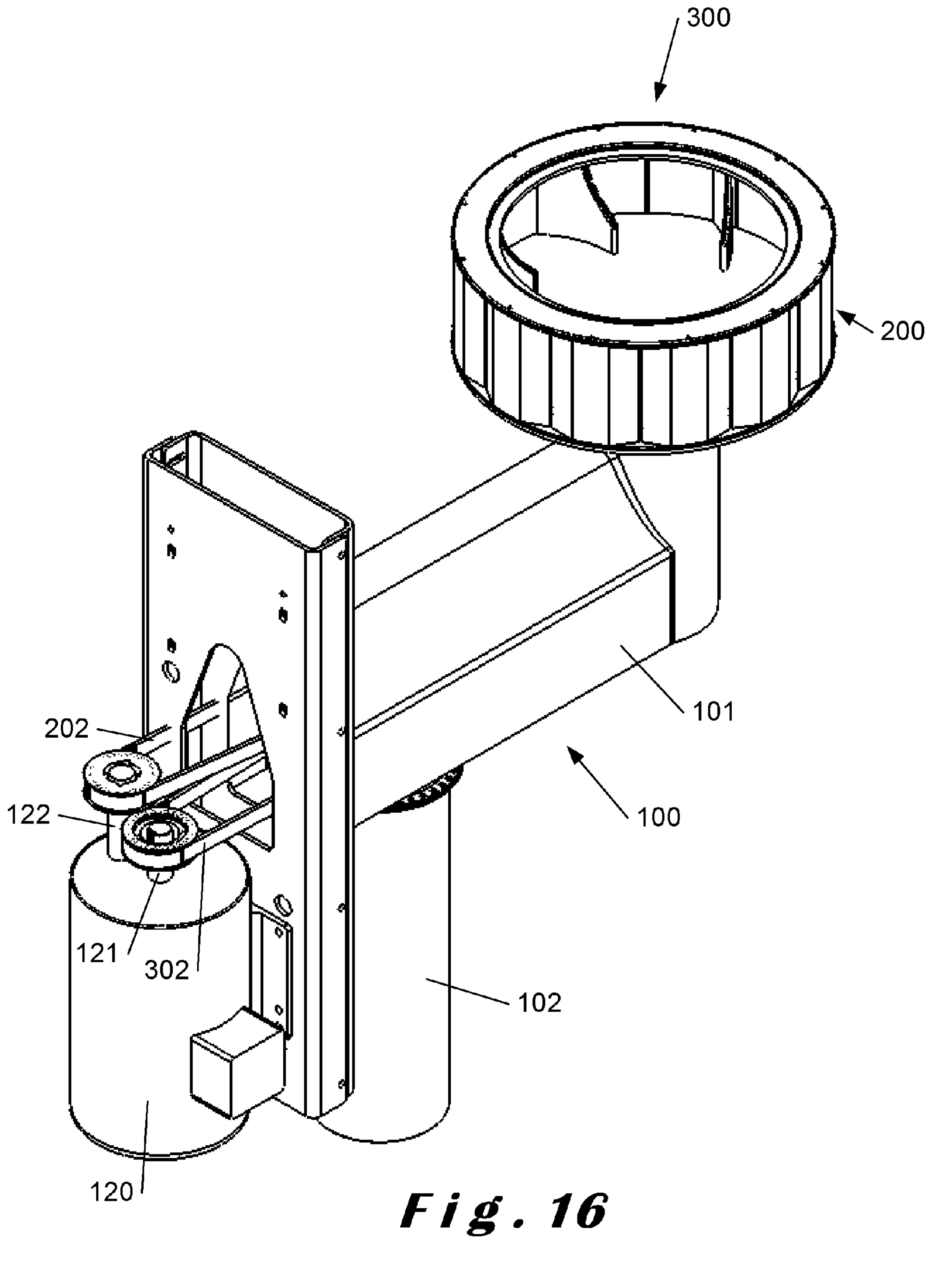
FIG. 16 shows a perspective view of a fourth preferred embodiment of a cutting apparatus according to the invention.

The cutting apparatus shown in FIG. 16 is similar to that of FIGS. 4-5 in that it has the same cutting head 200 and impeller 300 with concentrical drive shafts, mounted on a base 100 comprising an arm 101 which is rotatably mounted on a post 102. The drive mechanisms for the cutting head and the impeller are however different in the aspect that they comprise a shared motor 120 with two shafts: a first shaft 121 running the drive belt 302 for the impeller 300 and a second shaft 122 running the drive belt 202 for the cutting head 200. These shafts 121, 122 are internally coupled to each other by means of a gear mechanism which sets a predetermined ratio of the rotational speeds of the shafts and the rotational relationship, i.e. whether the cutting head and the impeller rotate in the same direction or not. So in this embodiment there is a fixed ratio between the impeller rotational speed of the impeller 300 and the cutting head rotational speed of the cutting head 200, which means that this apparatus is configured for always cutting the same product or at least products for which the fixed ratio is optimal.

Figure 17:
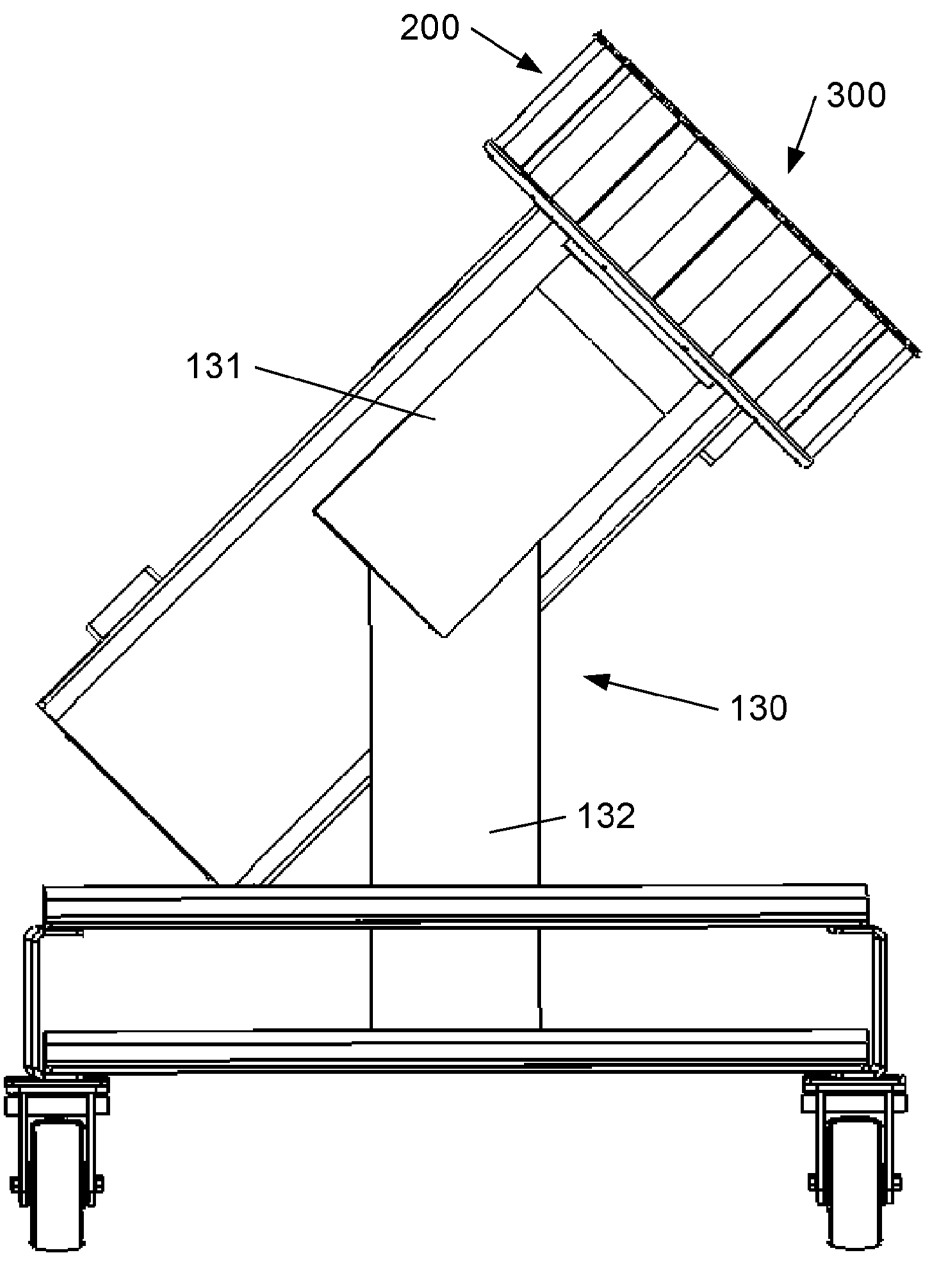
FIG. 17 shows a perspective view of a fifth preferred embodiment of a cutting apparatus according to the invention.

The cutting apparatus shown in FIG. 17 is similar to that of FIGS. 4-5 in that it has the same cutting head 200 and impeller 300 with concentrical drive shafts, mounted on a top part 131 of a base 130 which is tiltably fixed on a vertical post 132. In this way, the top part 131 carrying the cutting head 200 and impeller 300 can be tilted as a whole, so that the angle at which the cutting head 200 and the impeller 300 rotate is adaptable to the situation.

Below, the operation of the cutting apparatus of the invention will be discussed in general by reference to FIGS. 18-20. For the sake of simplicity, the reference numbers of the first embodiment of FIGS. 4-8 are used, but note that each of these situations can be applied to each of the above described embodiments as well as any other variations utilizing the principles of the present invention. In these figures, the cutting elements 208 of the cutting head 200 are oriented to impart cutting action in counterclockwise direction, i.e. the cutting elements cut through the product in counterclockwise direction or, alternatively stated, the product passes the cutting elements in clockwise direction. This is the mode of operation which is used in the art (with stationary cutting heads), but it is evident that the orientation of the cutting elements can be turned around to impart cutting action in clockwise direction. The arrows $v_{CH}$ and $v_{IMP}$ on these figures respectively represent the rotational speed of the cutting head and the rotational speed of the impeller.

Figure 20:
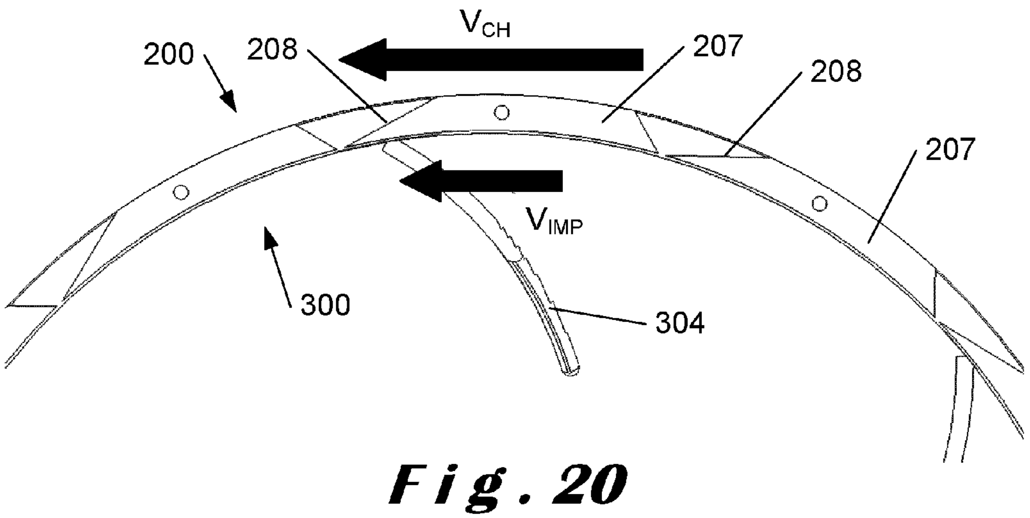

In the situation of FIG. 20, which represents an embodiment of the main operational mode according to the invention, the impeller 300 and the cutting head 200 rotate in the same direction, namely both counterclockwise, with the impeller 300 at a smaller rotational speed than the cutting head 200. The impeller rotational speed $v_{IMP}$ of the impeller 300 sets the centrifugal force, i.e. the force with which the product is pressed against the interior of the cutting stations 207. As the impeller rotational speed $v_{IMP}$ is smaller than the cutting head rotational speed $v_{CH}$, the cutting elements 208 move towards the paddles 304, so towards the product to be cut which is in this case pressed onto the paddles by the cutting elements cutting into the food product. The cutting velocity is determined by the difference between the rotational speeds. It is remarked that in this situation, the impeller 300 in fact does not function in the same way as an impeller known in the art. The impeller 300 still determines the rotational speed (and hence the centrifugal force) at which product which is being cut rotates, but the paddles 304 in fact do not "impel" the product. The paddles 304 here function as obstructions against which product that is being cut is pushed by the cutting elements 208.

Figure 18:
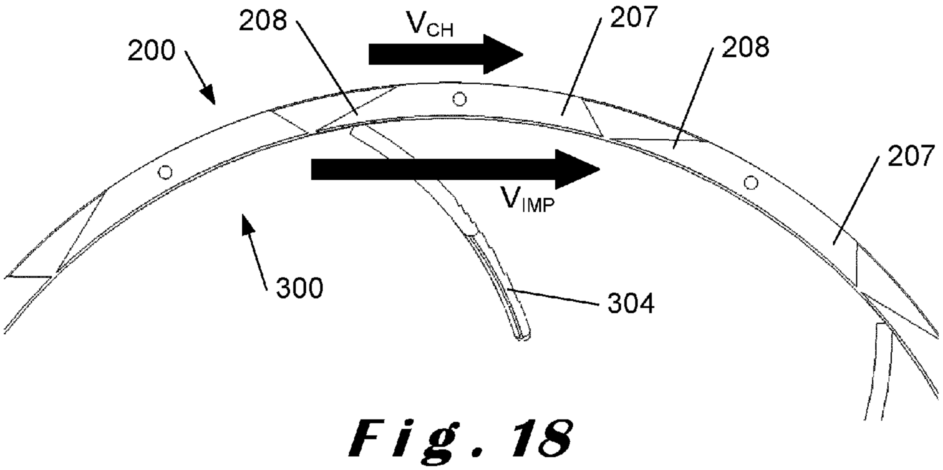
FIGS. 18-20 show top views of part of the cutting head and the impeller of an apparatus according to the invention to explain its operation.

In the situation of FIG. 18, which represents an optional operational mode which may be provided in addition to the operational mode of FIG. 20, the impeller 300 and the cutting head 200 rotate in the same direction, namely both clockwise. They rotate at different rotational speeds, i.e. the cutting head is not stationary with respect to the impeller. The impeller rotational speed $v_{IMP}$ of the impeller 300 is greater than the cutting head rotational speed $v_{CH}$ of the cutting head 200, so that the paddles 304 of the impeller move the product towards the cutting elements 208. The impeller rotational speed of the impeller 300 sets the centrifugal force exerted on the product, i.e. the force with which the product is pressed against the interior of the cutting stations 207. The difference in rotational speed sets the cutting velocity with which the cutting elements 208 cut through the product, which is pushed towards them by means of the paddles of the impeller 304.

Figure 19:
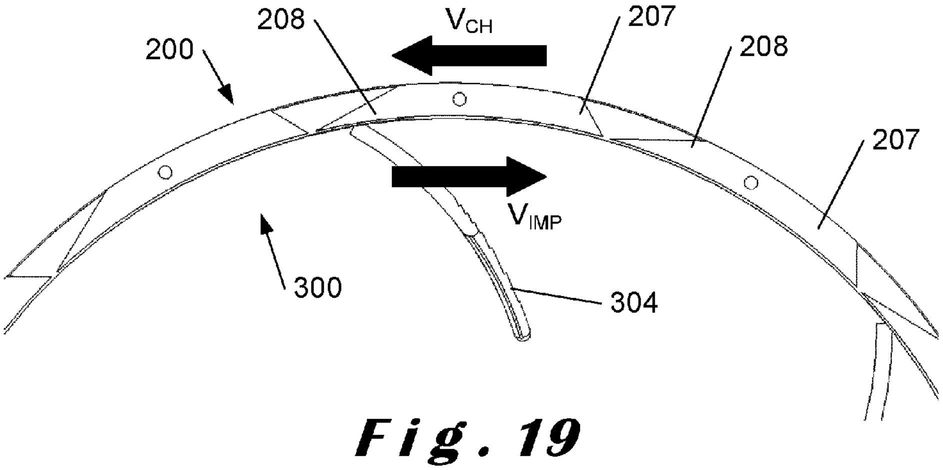

In the situation of FIG. 19, which represents another optional operational mode which may be provided in addition to the operational mode of FIG. 20, the impeller 300 and the cutting head 200 rotate in opposite directions, namely the impeller 300 rotates clockwise and the cutting head 200 rotates counterclockwise. In this situation, the impeller and cutting head rotational speeds $v_{IMP}$ and $v_{CH}$ can be equal or different in absolute value. The impeller rotational speed $v_{IMP}$ of the impeller 300 sets the centrifugal force. The cutting velocity is related to the sum of the absolute values of the rotational speeds $v_{CH}$ and $v_{IMP}$, as their direction is opposite.

By way of example, some preferred settings for cutting potatoes are given. Table 1 below shows the relationship between the impeller rotational speed for a 178 mm radius and the centrifugal force experienced by potatoes of different weights. At 260 RPM, the centrifugal acceleration (g-force) is 131.95 m/s$^2$ (≅13 g) which corresponds to the centrifugal forces in the second column for the weights given in the first column; at 230 RPM, the centrifugal acceleration (g-force) is 103.26 m/s$^2$ (≅10 g) which corresponds to the centrifugal forces in the third column for the weights given in the first column.

TABLE 1

| | IMPELLER RPM | |
|---|---|---|
| POTATO WEIGHT | CENTRIFUGAL ACCELERATION 131.95 m/s$^2$ (≅13 g) @ 260 RPM & 178 mm RADIUS | CENTRIFUGAL ACCELERATION 103.26 m/s$^2$ (≅10 g) @ 230 RPM & 178 mm RADIUS |
| 0.70 kg | 92 N | 72 N |
| 0.45 kg | 59 N | 46 N |
| 0.30 kg | 40 N | 31 N |
| 0.20 kg | 26 N | 21 N |
| 0.10 kg | 13 N | 10 N |

It has been found that the impeller rotational speed is preferably controlled such that the g-force experienced by product being cut is in the range of 1 to 50 g's (1 g=9.8 m/s$^2$), although even higher g-forces may be used, for example in comminuting.

For cutting potatoes, a range of 3 to 30 g's appears to yield the best results.

For cutting potatoes, the cutting velocity is preferably in the range of 0.3 to 4.8 m/s, more preferably in the lower half of this range.

For cutting or shredding cheese products, also a range of 3 to 30 g's appears to yield the best results.

For cutting or shredding cheese products, the cutting velocity is preferably in the range of 0.3 to 5.5 m/s.

Importantly, with the apparatus and method of the invention, the centrifugal force can be reduced with respect to the prior art with a stationary cutting head. In such prior art apparatuses, when cutting cheese products the impeller is rotated at a relatively high speed (e.g. 400 RPM) in order to obtain the desired cutting velocity, but at such speeds the cheese products may be undesirably compressed against the interior of the cutting head. So in order to obtain a good quality of cutting, the cheese product needed to be cooled to a temperature of −4° C. to harden the product and avoid compression. With the apparatus of the invention, the centrifugal force can be reduced and the cutting velocity set independently therefrom, so that the cutting operation can occur at higher temperatures, i.e. temperatures of −3° C. or above, e.g. at 10° C., reducing the extent of cooling needed prior to cutting.

Examples of other products which can be cut in a more advantageous way with the apparatus and method of the invention are nut products, e.g. almonds, peanuts (e.g. to manufacture peanut butter) or other nuts; root products, e.g. ginger, garlic, or other; and also other products such as e.g. orange peel.

Figure 23:
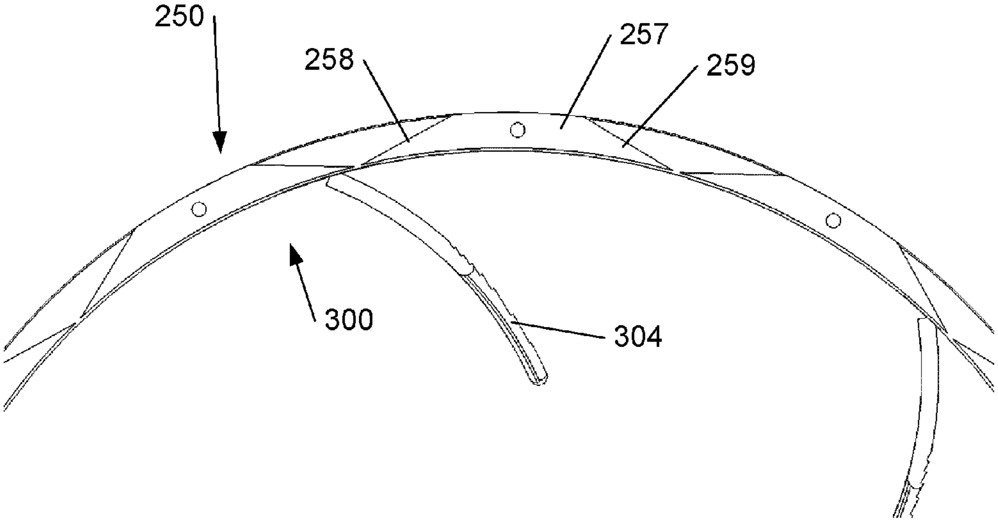
FIG. 23 shows a further alternative embodiment of a cutting head which can be used on apparatuses according to the invention.

FIG. 23 shows a further alternative embodiment of a cutting head 250 which can be used on apparatuses according to the invention, for example together with the same impeller 300 described above. The cutting head 250 comprises cutting stations 257 which have cutting elements 258, 259 at both ends. These cutting stations 257 are tiltable for setting the gap and also for setting the direction in which the cutting head cuts, i.e. in clockwise or counterclockwise directions. In other words, this cutting head 257 is capable of cutting products by rotation in either direction, provided that the cutting stations are correctly set.

In further embodiments (not shown), the impeller drive shaft could also be made hollow, for example for accommodating a large bolt with which the impeller is fixed to the impeller drive shaft, or for connecting a liquid supply and supplying a liquid (e.g. water) to the cutting head from the bottom side through the impeller drive shaft, or both, in which case the bolt would also be hollow.

The invention claimed is:

1. An apparatus for cutting products, comprising:
- a base;
- a cutting head with at least one cutting element along the circumference of the cutting head for cutting products fed into the cutting head, the cutting head being rotatably fitted to the base with the at least one cutting element oriented to impart cutting action in a first rotational direction;
- an impeller adapted for rotating concentrically within the cutting head to urge products fed into the cutting head towards the circumference of the cutting head by means of centrifugal force;
- an impeller drive mechanism including an impeller motor adapted for directly driving the impeller to rotate the impeller in said first rotational direction at an impeller rotational speed which sets the centrifugal force; and
- a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;
- wherein the base comprises a post including an impeller arm carrying the impeller motor with the impeller, and a cutting head arm carrying the cutting head motor with the cutting head, the cutting head arm being movably mounted to the post such that the cutting head can be removed from around the impeller.

2. The apparatus of claim 1, wherein the impeller drive mechanism and the cutting head drive mechanism are provided with controls for controlling the impeller rotational speed and the cutting head rotational speed within respectively a first range and a second range.

3. The apparatus of claim 1, wherein the impeller drive mechanism comprises an impeller drive shaft by which the impeller is driven and the cutting head drive mechanism comprises a cutting head drive shaft by which the cutting head is driven, the cutting head drive shaft being hollow and the impeller drive shaft being rotatably mounted within the cutting head drive shaft.

4. The apparatus of claim 1, wherein the rotation of the impeller inside the cutting head is stabilised by means of a spring-loaded pin on the impeller which fits into a tapered hole in the centre of the cutting head.

5. The apparatus of claim 1, wherein the impeller drive mechanism and the cutting head drive mechanism together comprise a shared motor and a gearbox, adapted for setting the difference between the impeller rotational speed and the cutting head rotational speed.

6. The apparatus of claim 1, wherein the cutting head and the impeller are oriented to rotate around a vertical axis.

7. The apparatus of claim 1, wherein the cutting head and the impeller are oriented to rotate around a horizontal axis.

8. An apparatus for cutting products, comprising:
- a base;
- a cutting head with at least one cutting element along the circumference of the cutting head for cutting products fed into the cutting head, the cutting head being rotatably fitted to the base with the at least one cutting element oriented to impart cutting action in a first rotational direction;
- an impeller adapted for rotating concentrically within the cutting head to urge products fed into the cutting head towards the circumference of the cutting head by means of centrifugal force;
- an impeller drive mechanism including an impeller motor adapted for directly driving the impeller to rotate the impeller in said first rotational direction at an impeller rotational speed which sets the centrifugal force; and
- a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;
- wherein the cutting head and the impeller are mounted on a tiltable part of the base, in which the rotation axis of the cutting head and the impeller can be tilted to different angles.

9. An apparatus for cutting products, comprising:
- a base;
- a cutting head with at least one cutting element along the circumference of the cutting head for cutting products fed into the cutting head, the cutting head being rotatably fitted to the base with the at least one cutting element oriented to impart cutting action in a first rotational direction;
- an impeller adapted for rotating concentrically within the cutting head to urge products fed into the cutting head towards the circumference of the cutting head by means of centrifugal force;
- an impeller drive mechanism including an impeller motor adapted for directly driving the impeller to rotate the impeller in said first rotational direction at an impeller rotational speed which sets the centrifugal force; and
- a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;

wherein the apparatus is configured for cutting potatoes, wherein controls are provided for setting the predetermined difference between the impeller and cutting head rotational speeds such that a cutting velocity below 4.8 m/s is obtained.

10. An apparatus for cutting products, comprising:

a base;

a cutting head with at least one cutting element along the circumference of the cutting head for cutting products fed into the cutting head, the cutting head being rotatably fitted to the base with the at least one cutting element oriented to impart cutting action in a first rotational direction;

an impeller adapted for rotating concentrically within the cutting head to urge products fed into the cutting head towards the circumference of the cutting head by means of centrifugal force;

an impeller drive mechanism including an impeller motor adapted for directly driving the impeller to rotate the impeller in said first rotational direction at an impeller rotational speed which sets the centrifugal force; and a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;

wherein the apparatus is configured for cutting potatoes, wherein controls are provided for setting the impeller rotational speed such that the potatoes are cut while experiencing a g-force of 3 to 30 g's.

11. An apparatus for cutting products, comprising:

a base;

a cutting head with at least one cutting element along the circumference of the cutting head for cutting products fed into the cutting head, the cutting head being rotatably fitted to the base with the at least one cutting element oriented to impart cutting action in a first rotational direction;

an impeller adapted for rotating concentrically within the cutting head to urge products fed into the cutting head towards the circumference of the cutting head by means of centrifugal force;

an impeller drive mechanism including an impeller motor adapted for directly driving the impeller to rotate the impeller in said first rotational direction at an impeller rotational speed which sets the centrifugal force; and a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;

wherein the apparatus is configured for cutting cheese products, wherein controls are provided for setting the predetermined difference between the impeller and cutting head rotational speeds such that a cutting velocity below 5.5 m/s is obtained.

12. An apparatus for cutting products, comprising:

a base;

a cutting head with at least one cutting element along the circumference of the cutting head for cutting products fed into the cutting head, the cutting head being rotatably fitted to the base with the at least one cutting element oriented to impart cutting action in a first rotational direction;

an impeller adapted for rotating concentrically within the cutting head to urge products fed into the cutting head towards the circumference of the cutting head by means of centrifugal force;

an impeller drive mechanism including an impeller motor adapted for directly driving the impeller to rotate the impeller in said first rotational direction at an impeller rotational speed which sets the centrifugal force; and a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;

wherein the apparatus is configured for cutting cheese products, wherein controls are provided for setting the impeller rotational speed such that the cheese products are cut while experiencing a g-force of 3 to 30 g's.

13. An apparatus for cutting products, comprising:

a base;

a cutting head with at least one cutting element along the circumference of the cutting head for cutting products fed into the cutting head, the cutting head being rotatably fitted to the base with the at least one cutting element oriented to impart cutting action in a first rotational direction;

an impeller adapted for rotating concentrically within the cutting head to urge products fed into the cutting head towards the circumference of the cutting head by means of centrifugal force;

an impeller drive mechanism including an impeller motor adapted for directly driving the impeller to rotate the impeller in said first rotational direction at an impeller rotational speed which sets the centrifugal force; and a cutting head drive mechanism having a second motor adapted for driving the cutting head to rotate the cutting head in said first rotational direction at a cutting head rotational speed which is a predetermined difference greater than the impeller rotational speed, such that the product is cut by the at least one cutting element at a predetermined cutting velocity;

wherein the apparatus is wherein at least one of the impeller drive mechanism and the cutting head drive mechanism is further adapted for driving the impeller or the cutting head, respectively, to make it rotate in a second rotational direction opposite said first rotational direction.

* * * * *